United States Patent Office 2,914,394
Patented Nov. 24, 1959

---

2,914,394

BRIQUETTING OF ORES

Heinrich Dohmen, Deventer, Netherlands

No Drawing. Application March 26, 1957
Serial No. 648,525

Claims priority, application Germany April 5, 1956

8 Claims. (Cl. 75—3)

The invention relates to processes of briquetting of ores, to binding agents for use in the processes, to briquets of ores obtained by the processes, and to processes of producing the binding agent.

This invention consists therein, that a binding agent, consisting in the main part of a finely comminuted clay-lime mixture, preferably marl, and other ingredients, is added to the finely comminuted ores. According to the invention the other ingredients of the binding agent consist preferably of a solution of sulphates such as magnesium sulphate, iron sulphate or the like in water, a starch and a solution of hydroxides such as potassium hydroxide, sodium hydroxide or the like in water. After thoroughly mixing these ingredients with the finely comminuted clay-lime mixture, preferably marl, the mixture is kneaded and pressed to briquets.

A preferred process according to the invention is worked along the following lines.

The marl is comminuted to particles of less than 5 mm. A marl is used having a content of carbonate of lime ($CaCO_3$) of about 50–90%.

Magnesium sulphate ($MgSO_4$) is dissolved in water of about 50–100° C., and that about 5 grams of $MgSO_4$ each in 1 dm.³ of water. About 1% of this $MgSO_4$-solution that is 10 cm.³ on each kilogram of marl are added to the marl and mixed with it. The degree of moisture of the mixture of the marl and other substances should not be higher than about 10%.

Furthermore potassium hydroxide (KOH) is dissolved in warm water, and that about 10 grams KOH each per 1 dm.³ of water. This KOH-solution is added to a starch such as sago starch, potato starch, maize-starch or the like starches, and that in a quantity of about 10 grams to 1 kilogram of starch.

Then the mixture is heated up to about 50° C.

About 4–6% of this mixture, calculated on the weight of ores, are added to the ores and thoroughly mixed with them. Then the ores with the added substances are treated in a kneading machine and pressed in a briquetting press at a temperature of about 75° C. or a higher temperature.

By use of the novel binding agent binding of the substances of the briquets will be better than with the known binding agents and smearing over of the presses is obviated. Furthermore the briquets have a smooth surface.

The binding effect of the starch is still increased by the addition of the potassium hydroxide to it.

Furthermore about 0.2% or somewhat more or less of paraffin as a water repelling agent may be added to the mass to be briquetted.

By the high content of lime in the novel binding agent the slag obtained in the smelting operations is of high value for the manufacturing of fertilizer.

If instead of marl another clay-lime mixture is used, the finely divided clay and the finely divided lime are thoroughly mixed one with another and the process is worked in the same manner as described above. In the clay-lime mixture the content of lime amounts to about 20–60 percent by weight and the content of clay to about 80–40 percent by weight. The other substances of the mixture are used in corresponding quantities. Obviously different clay-lime mixtures may be used. Other clay-lime mixtures may also be used besides the marl.

It is to be understood, of course, that the invention should not be limited to the embodiments described herein, since modifications may be made within the scope of the claims.

What I claim as new and desire to secure by Letters Patent of the United States is:

1. A process of briquetting ores comprising adding to the finely comminuted ores a binding agent consisting of a mixture of a finely comminuted clay-lime mixture, a starch, an aqueous solution of sulphate selected from the group consisting of magnesium sulphate and iron sulphate in the ratio of 5 grams of sulphate to each litre of water, adding 10 cc. of this solution to each kilogram of clay-lime mixture, an aqueous solution of hydroxide selected from the group consisting of potassium hydroxide and sodium hydroxide in the ratio of 10 grams of hydroxide to each litre of water, adding 10 grams of this solution to every kilogram of starch, and then kneading the mixture and briquetting it by pressing.

2. A process of briquetting ores comprising forming a binding agent including a mixture of a finely comminuted clay-lime mixture, a starch, an aqueous solution of sulphate selected from the group consisting of magnesium sulphate and iron sulphate in the ratio of 5 grams of sulphate to each litre of water, adding 10 cc. of this solution to each kilogram of clay-lime mixture, an aqueous solution of hydroxide selected from the group consisting of potassium hydroxide and sodium hydroxide in the ratio of 10 grams of hydroxide to each litre of water, adding 10 grams of this solution to every kilogram of starch, heating said binding agent to about 50° C., adding 4–6% of the binding agent by weight of the ores to the ores, kneading the mixture of ores and binding agent, and briquetting it by pressing at a temperature of about 75° C.

3. A binding agent for use in the briquetting of ores comprising a mixture of a finely comminuted clay-lime mixture, an aqueous solution of sulphate selected from the group consisting of magnesium sulphate and iron sulphate in the ratio of 5 grams of sulphate to each litre of water, an aqueous solution of hydroxide selected from the group consisting of potassium hydroxide and sodium hydroxide in the ratio of 10 grams of hydroxide to each litre of water, and starch in the ratio of 10 grams of sulphate solution to each kilogram of starch.

4. A process of producing a binding agent for use in the briquetting of ores comprising a starch, dissolving 5 grams of a sulphate selected from the group consisting of magnesium sulphate and iron sulphate, in each litre of warm water, adding 10 cc. of this sulphate solution to every kilogram of a finely comminuted clay-lime mixture, dissolving 10 grams of a hydroxide selected from the group consisting of potassium hydroxide and sodium hydroxide, in each litre of warm water, treating the starch with this hydroxide solution in a ratio of 100:1 by weight, and adding 50 grams of said treated starch to every kilogram of the clay-lime mixture and sulphate solution.

5. A process of producing a binding agent for use in the briquetting of ores comprising a starch, dissolving 5 grams of magnesium sulphate in each litre of water at 50–100° C., adding 10 cc. of this solution to every kilogram of finely comminuted marl, dissolving 10 grams of potassium hydroxide in each litre of warm water, adding 10 grams of this solution to each kilogram of starch, and adding 50 grams of this mixture to each kilogram of the marl treated with the sulphate solution.

6. A briquet of ores comprising a pressed mixture of a binding agent and comminuted ore, said binding agent including a finely comminuted clay-lime mixture, an aqueous solution of sulphate selected from the group consisting of magnesium sulphate and iron sulphate in the ratio of 5 grams of sulphate to each litre of water, an aqueous solution of hydroxide selected from the group consisting of potassium hydroxide and sodium hydroxide in the ratio of 10 grams of hydroxide to each litre of water, and starch in the ratio of 10 grams of sulphate solution to each kilogram of starch.

7. A process of briquetting ores comprising comminuting marl having a calcium carbonate content of 50–90% into particles less than 5 mm., a starch; dissolving magnesium sulphate in water at 50–100° C. in a ratio of 5 grams of magnesium sulphate to each litre of water, mixing the marl with this solution in a ratio of 10 cc. of solution to each kilogram of marl, dissolving potassium hydroxide in warm water in a ratio of 10 grams of potassium hydroxide to each litre of water, adding this latter solution to the starch in a ratio of 1:100 by weight, mixing the treated starch and the treated marl in a ratio of 1:20 by weight, adding this final mixture to the ores in a ratio of 2–3:50 by weight, kneading the treated ores, and briquetting it by pressing at a temperature of at least 75° C.

8. A binding agent for use in the briquetting of ores comprising a mixture of a finely comminuted clay-lime mixture, an aqueous solution of sulphates selected from the group consisting of magnesium sulphate and iron sulphate, starch, and an aqueous solution of hydroxides selected from the group consisting of potassium hydroxide and sodium hydroxide.

References Cited in the file of this patent

UNITED STATES PATENTS

| | | |
|---|---|---|
| 266,145 | Henderson | Oct. 17, 1882 |
| 933,270 | Schumacher | Sept. 7, 1909 |
| 1,168,401 | Kippe | Jan. 18, 1916 |
| 1,428,061 | Rouse | Sept. 5, 1922 |
| 1,576,558 | Stull | Mar. 16, 1926 |
| 1,789,895 | Fassotte | Jan. 20, 1931 |